Patented Aug. 4, 1931

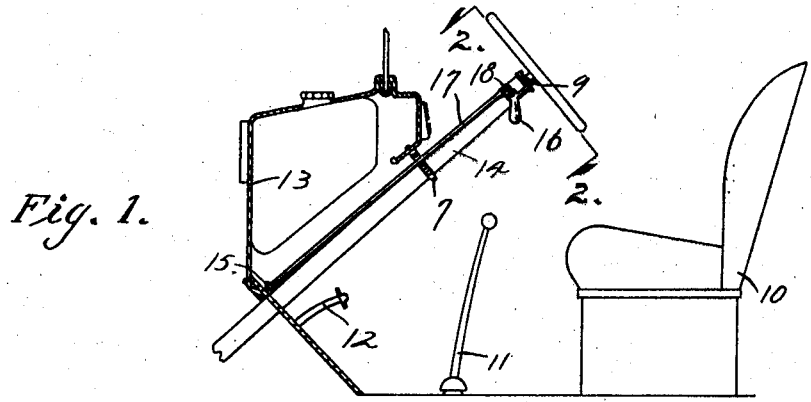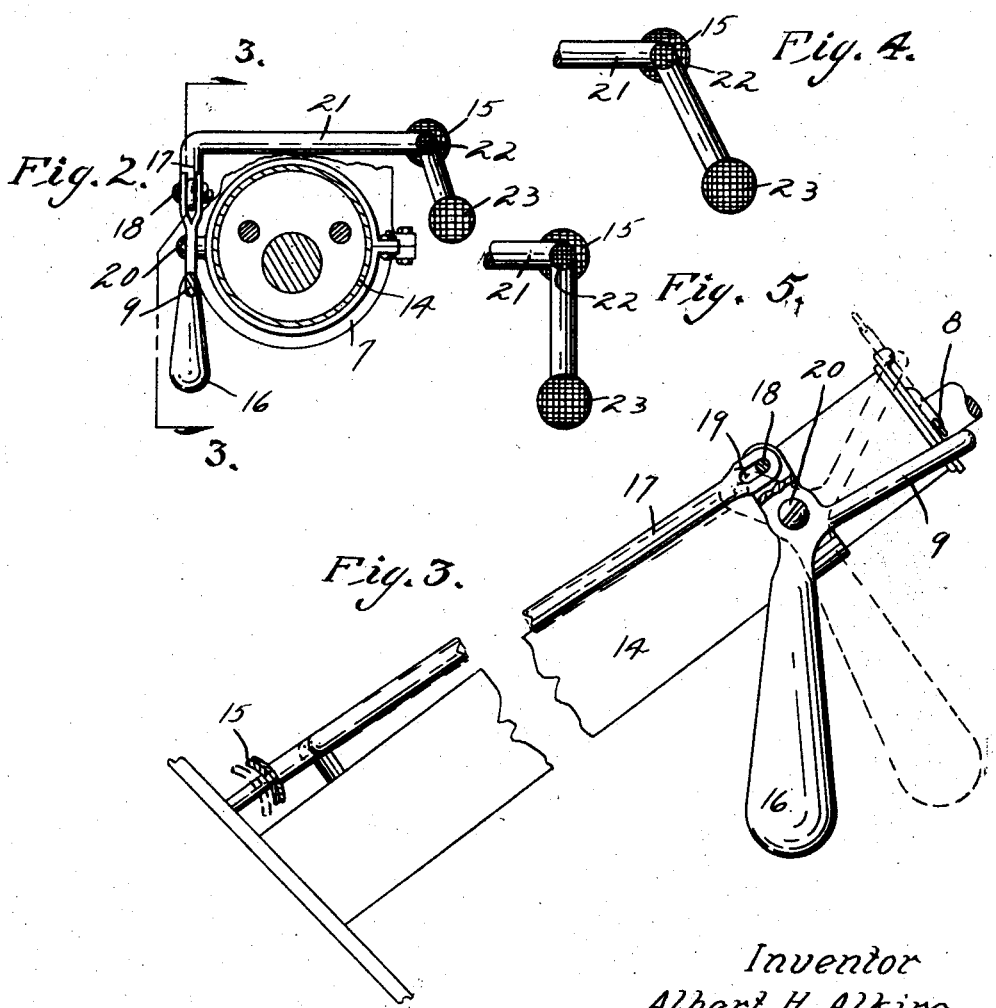

1,817,472

UNITED STATES PATENT OFFICE

ALBERT H. ALKIRE, OF DES MOINES, IOWA

MEANS FOR ACTUATING THE ELECTRIC STARTERS OF AUTOMOBILES AND CONCURRENTLY RETARDING THE IGNITION SPARKS IN THE ENGINES THEREOF

Application filed August 12, 1929. Serial No. 385,427.

This invention relates to improvements in means for putting into operation electric starters on automobiles and comprises a combination of mechanisms by which an electric automobile starter may be put into operation by the hand of the driver instead of by his foot as is usually done and, at the same time, the spark lever is automatically pushed to a "retarded" position so as to avoid any danger of "backfiring" which is liable to break some part of the starter mechanism.

When the electric starter is actuated by the driver's foot he is liable to forget to first retard the spark lever with consequent danger of backfiring and serious damage but when my invention is applied to automobiles the starter can be actuated by the driver's foot in the usual way, if he desires, as well as by his hand, as will be more fully explained hereafter, but at the same time the spark lever will also be automatically retarded thereby absolutely eliminating danger of backfiring.

One object of this invention is to provide an alternative and more convenient means of putting in operation the starter mechanism of an automobile.

Another object is to provide a means for entirely preventing liability of backfiring and probable damage to the starter in an automobile engine by reason of the spark lever being in the "advanced" position when the engine is started.

The form shown in the drawings is especially adapted for use in model A Ford automobiles but with modifications obvious to any mechanic it can be used on the starter of any make of gasoline automobile.

With these and other objects more fully described in the following specification and accompanying drawings, this invention comprises novel constructions and arrangements of parts the best form of which that is known to me is illustrated in the accompanying drawings and the principles of which are more particularly pointed out in the appended claims, but I disclaim being restricted to the exact mechanism shown or otherwise than by the appended claims for the invention may be constructed in various forms and for use on different makes of gasoline automobiles within the scope of said claims.

In the drawings, Fig. 1 is a vertical section through the driver's seat, steering wheel assembly, cowl, etc., of a model A Ford automobile and shows also a side elevation of the clutch and the gear shift lever.

Fig. 2 is a cross section along line 2—2 of Fig. 1 and shows also plan views of the starting handle and rod extension of this part as described below.

Fig. 3 is a side elevation of the steering wheel post of an automobile with a part thereof "broken out" and shows also a side elevation of my invention attached to the steering wheel post with a cross section of certain parts thereof along line 3—3 of Fig. 2.

Figs. 4 and 5 are plan views of a modified form of one part of my invention.

The same numerals indicate the same parts in the different figures.

Referring to the drawings by these numerals; 10 is the driver's seat; 11 is the gear shift lever; 12 is the clutch pedal; 13 is the cowl and tank; 14 is the steering wheel post of an automobile; 15 is the starter button.

Numeral 16 is the handle of my mechanism for operating the electric starter by the driver's hand; 17 is the rod for transmission of movement from handle 16 to starter button 15. To handle 16 is attached an extension or finger 9 for actuating spark lever 8 and 7 is a slide clamped to 14 to keep 17 in position. Rod 17 is connected with handle 16 by pin 18 which is adjustable in slot 19 for a purpose explained hereafter.

Handle 16 turns on hinge bolt 20. The lower end of rod 17 is bent at approximately right angles forming a part 21 which presses down and so actuates starter button 15 when handle 16 is raised up. Part 21 may be further extended and again bent in approximately the plane of the floor board at that place and on it may be placed pedals 22 and 23 for a purpose explained hereafter.

Owing to its location it is inconvenient for anyone to reach with his foot the starter button of a model A Ford automobile as well as in many other automobiles. For short persons and especially for ladies with narrow, pointed-toe shoes this is practically impossible to accomplish with ease and certainty. Moreover, the driver often forgets to properly "retard" the ignition spark so that the engine, when started, is liable to backfire which often seriously damages the starter mechanism. These disadvantages are all overcome by the use of my invention.

Its operation is as follows: When the driver wishes to start an automobile engine, instead of pressing with his foot on a starter button on the floor, he raises with his hand handle 16 from the position shown in full lines in Fig. 3 to the position shown in broken lines. This depresses rod 17 which, in turn, depresses starter button 15 thereby causing an electric connection and so causing the revolution of the electric starter.

At the same time, finger 9 pushes forward spark lever 8, thus automatically retarding the ignition spark each and every time the starter is used and so entirely eliminating all danger of the engine backfiring while the starter is in gear.

When the driver releases handle 16 the assembly returns to the neutral position shown in full lines in Fig. 3 and spark lever 8 can then be reset at whatever advance the driver may desire the same as is necessary when the engine is started by the ordinary means.

Slot 19, in connection with pin 18, permits adjustment of the amount the spark lever is "retarded" each time which is desirable because different cars may require different amounts of spark retardation for best results when starting.

It is obvious that the starter can whenever desired, be also actuated by the driver's foot applied at 22 or 23 of my mechanism, the latter being particularly convenient for short persons and ladies wearing pointed-toe shoes. When thus actuated by the driver's foot the action of finger 9 on spark lever 8 is the same as explained above when handle 16 is moved by hand, so that my invention, under all conditions prevents backfiring and resultant damage therefrom, the most frequent cause of broken starters.

It is obvious that my invention can be used on any internal combustion engine comprising an electric starting device for starting the engine.

I thus, by my invention, provide means for conveniently actuating the electric starter of gasoline automobiles and, at the same time, automatically preventing under any and all conditions the expensive damage that frequently occurs from backfiring caused by an "advanced" position of the ignition spark.

I claim:

1. In combination for concurrently actuating the electric starter and retarding the ignition spark of an internal combustion engine, a handle hinged to the steering wheel post of an automobile, an extension of said handle for moving to the retarding position the spark lever, a rod substantially parallel to said steering wheel post and moved by said handle, said rod having at its lower end a bent portion for pressing down the starter button when the rod is moved down by said handle.

2. In combination for concurrently actuating the electric starter and retarding the ignition spark of an internal combustion engine of an automobile, a handle hinged to the steering wheel post of the automobile, an extension of said handle for moving the spark lever to the "spark retarded" position, a rod substantially parallel to said steering wheel post and moved by said handle, said rod having at its lower end a bent portion for pressing down the starter button when the rod is moved down by said handle, said bent portion having an extension thereon beyond the starter button which gives a means by which said rod can be pressed down by the driver's foot thereby concurrently actuating the electric starter and retarding the ignition spark.

ALBERT H. ALKIRE.